US010473069B2

(12) United States Patent
Sasaki

(10) Patent No.: US 10,473,069 B2
(45) Date of Patent: Nov. 12, 2019

(54) FUEL LINE PROTECTIVE STRUCTURE

(71) Applicant: HONDA MOTOR CO., LTD., Minato-ku, Tokyo (JP)

(72) Inventor: Takumi Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/017,023

(22) Filed: Jun. 25, 2018

(65) Prior Publication Data

US 2019/0010904 A1 Jan. 10, 2019

(30) Foreign Application Priority Data

Jul. 4, 2017 (JP) .................................. 2017-131407

(51) Int. Cl.
*F02M 37/00* (2006.01)
*B60K 15/01* (2006.01)
*B60K 15/03* (2006.01)

(52) U.S. Cl.
CPC ......... *F02M 37/0017* (2013.01); *B60K 15/01* (2013.01); *F02M 37/007* (2013.01); *B60K 2015/03375* (2013.01); *B60Y 2306/01* (2013.01)

(58) Field of Classification Search
CPC ....... F02M 35/10216; F02M 35/10354; F02M 37/00; F02M 37/0017; F02M 2200/185; F02D 41/021; B60R 21/01; B60R 21/0136; B60R 2021/0004; B60K 15/01
USPC ...... 123/195 A, 195 P, 195 R, 198 E, 198 R, 123/109, 110, 125, 138, 445, 468
See application file for complete search history.

(56) References Cited

U.S. PATENT DOCUMENTS

| 9,644,583 | B2 | 5/2017 | Ishiki et al. |
| 2004/0159302 | A1 | 8/2004 | Horibe et al. |
| 2006/0005800 | A1 | 1/2006 | Fujii |
| 2015/0101696 | A1 | 4/2015 | Ishiki et al. |
| 2017/0306909 | A1 | 10/2017 | Tanaka et al. |

FOREIGN PATENT DOCUMENTS

| CN | 1526941 A | 9/2004 |
| CN | 1719010 A | 1/2006 |
| CN | 202992383 U | 6/2013 |

(Continued)

OTHER PUBLICATIONS

Decision to Grant a Patent for JP Application No. 2017-131407, dated Mar. 12, 2019, 3 pages.

(Continued)

*Primary Examiner* — John Kwon
*Assistant Examiner* — Johnny H Hoang
(74) *Attorney, Agent, or Firm* — Armstrong Teasdale LLP

(57) ABSTRACT

A protective structure includes: a base including a base main wall attached to a vehicle body wall defining a part of an engine room and extends vertically, a stay fixed to the base main wall to hold a fuel line, and a base extension wall extending from an upper part of the base main wall in a direction away from the vehicle body wall; a cover including a cover main wall disposed to oppose the base main wall and to be located in front of the stay and the fuel line, a cover extension wall extending from the cover main wall along the base extension wall, and a leg extending from the cover main wall toward the base main wall below the cover extension wall; and a fastening member extending vertically through overlapping parts of the base extension wall and the cover extension wall to fasten the base and cover.

13 Claims, 6 Drawing Sheets

(56) References Cited

FOREIGN PATENT DOCUMENTS

| | | |
|---|---|---|
| CN | 107448335 A | 12/2017 |
| JP | S5715725 U | 1/1982 |
| JP | 2004360581 A | 12/2004 |
| JP | 2015-78605 A | 4/2015 |
| JP | 2015074240 A | 4/2015 |
| JP | 2015078605 A | 4/2015 |

OTHER PUBLICATIONS

Office Action for CN Application No. 201810713281.3, dated May 29, 2019, and partial English translation thereof, 9 pages.

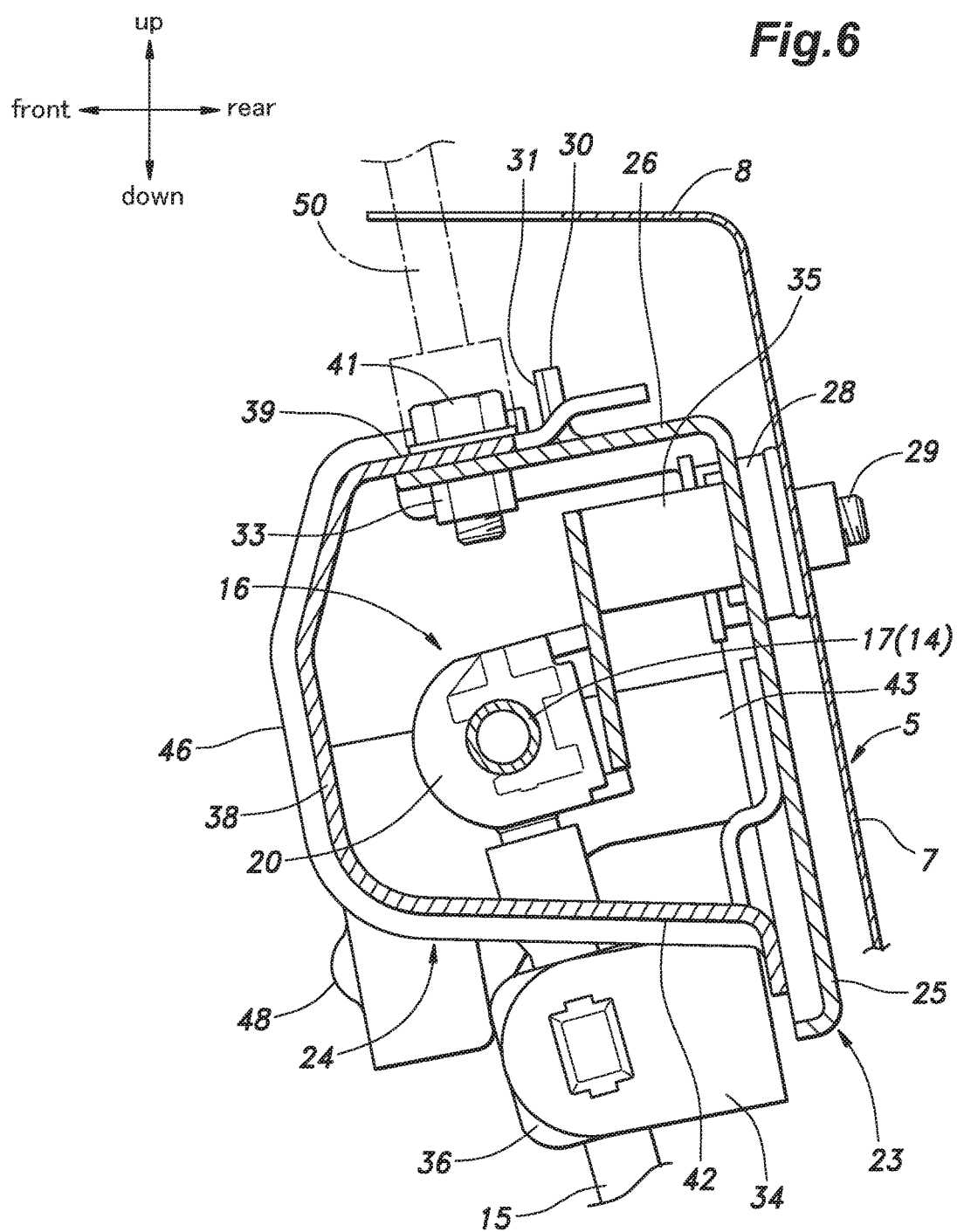

FUEL LINE PROTECTIVE STRUCTURE

TECHNICAL FIELD

The present invention relates to a fuel line protective structure for protecting a fuel line connected to an internal combustion engine (may be simply referred to as an engine).

BACKGROUND ART

JP2015-78605A discloses a fuel line protective structure including a base fastened to a front wall of a dashboard upper member and supporting a fuel line, and a cover fixed to the base and covering the fuel line from a side of an internal combustion engine.

In the fuel line protective structure shown in JP2015-78605A, the cover is fastened to a side of the base facing the engine by bolts. When tightening the bolts, it is necessary to insert a tool (e.g., an impact wrench) between the engine and the base and to engage the tool with the bolts from the engine side. However, the engine is typically arranged close to the front wall of the dashboard upper member to which the base is fastened, and therefore, it is difficult to secure a sufficient space between the engine and the base to insert the tool therein to tighten the bolts.

SUMMARY OF THE INVENTION

In view of such background, a primary object of the present invention is to provide a fuel line protective structure that can be assembled easily.

To achieve such an object, one aspect of the present invention provides a fuel line protective structure (22) comprising: a base (23) including a base main wall (25) that is attached to a vehicle body wall (5) defining a part of an engine room (2) and extends vertically, a stay (34, 35) fixed to the base main wall to hold a fuel line (14), and a base extension wall (26) extending from an upper part of the base main wall in a direction away from the vehicle body wall; a cover (24) including a cover main wall (38) disposed to oppose the base main wall and to be located in front of the stay and the fuel line, a cover extension wall (39) extending from the cover main wall along the base extension wall such that the cover extension wall overlaps the base extension wall as seen in plan view, and a leg (42, 43) extending from the cover main wall toward the base main wall below the cover extension wall; and a fastening member (41) extending vertically through overlapping parts of the base extension wall and the cover extension wall to fasten the base and the cover to each other.

According to this arrangement, a worker is allowed to engage a tool with the fastening member (such as a bolt) from above the protective structure, and hence, can perform fastening of the base extension wall and the cover extension wall with the fastening member easily. When a load is applied to the cover from the engine room side, the leg is supported by the base main wall, whereby a space accommodating the fuel line is maintained between the cover main wall and the base main wall, and hence, the fuel line is protected.

Preferably, a free end of the leg opposes the base main wall with a space defined between the free end and the base main wall.

According to this arrangement, generation of noise due to contact between the free end of the leg and the base main wall can be prevented.

Also preferably, the cover is provided with a rib (46, 47) extending from the cover extension wall to the leg via the cover main wall.

According to this arrangement, the rib improves the stiffness of the cover extension wall, the cover main wall, and the leg. Further, because the rib extends across the connecting parts between these members, the stiffness at the connecting parts can be improved.

Also preferably, the leg includes a first leg (42) extending from a lower end of the cover main wall toward the base main wall and a second leg (43) extending from a side edge of the cover main wall toward the base main wall.

According to this arrangement, when a load is applied to the cover from the engine room side, the two legs are supported by the base main wall. Therefore, a space accommodating the fuel line can be maintained between the cover main wall and the base main wall when a load is applied to the cover from the engine room side.

Also preferably, the cover includes a rib (47) extending from the cover extension wall to the second leg via the cover main wall, the rib being bent by about 90 degrees on the cover main wall.

According to this arrangement, the stiffness of the cover main wall is improved, and this prevents deformation of the cover main wall to thereby maintain a space between the cover main wall and the base main wall when a load is applied to the cover from the engine room side.

Also preferably, the fuel line is arranged to pass between the cover extension wall and the first leg and between the first leg and the second leg.

According to this arrangement, the fuel line can be protected even more reliably when a load is applied to the cover from the engine room side.

Also preferably, the first leg has a principal surface facing vertically, and the second leg has a principal surface facing laterally.

According to this arrangement, the first and second legs cooperate with each other to improve the stiffness of the cover both vertically and laterally, and therefore, can maintain the space accommodating the fuel line between the cover main wall and the base main wall when a load is applied to the cover from the engine room side.

Also preferably, the first leg is slanted downward toward a free end thereof.

According to this arrangement, rainwater or the like adhering to an upper surface of the first leg is caused to move downward along the upper surface and is discharged from the free end. This contributes to preventing corrosion of the first leg.

Also preferably, the base extension wall is provided with an upward protrusion (30), and the cover extension wall is provided with an opening (44) configured to receive the protrusion.

According to this arrangement, when fastening the cover to the base, a worker can hook the opening of the cover extension wall on the protrusion of the base extension wall to provisionally fix the cover to the base, and hence, can perform fastening of the cover to the base easily. Further, abutment of the protrusion and an edge of the opening contributes to improving the stiffness at the joint between the base extension wall and the cover extension wall against load applied from the engine room side.

Also preferably, the base is attached to the vehicle body wall at an upper part of the base main wall.

According to this arrangement, the load applied to the base extension wall from the cover is transmitted to the vehicle body wall via the upper part of the base main wall. As a result, deformation of the lower part of the base main wall is prevented.

Also preferably, the base and the cover are each made of a bent sheet member.

According to this arrangement, the base and the cover can be made easily and at low cost.

Also preferably, the leg has a free end including a portion extending substantially in parallel with the base main wall.

According to this arrangement, when a load is applied to the cover from the engine room side, the free end of the leg and the base main wall abut against each other with a contact larger area, and this stables the abutment of the leg against the base main wall. Therefore, a space accommodating the fuel line can be maintained more reliably.

Also preferably, the cover main wall is provided with an opening (49) for enabling visual inspection of the fuel line.

This arrangement enables visual inspection of the fuel line through the opening.

Thus, according to one aspect of the present invention, a fuel line protective structure that can be assembled easily is provided.

BRIEF DESCRIPTION OF THE DRAWINGS

FIG. 6 is a sectional view taken along line VI-VI of FIG. 3.

BRIEF DESCRIPTION OF THE DRAWINGS

In the following, a fuel line protective structure according to an embodiment of the present invention will be described with reference to the drawings. In this embodiment, the present invention is applied to a vehicle having an engine disposed in a front part of a vehicle body. In the following description, the directions such as front, rear, left, and right are defined with respect to the vehicle body.

Figure 1:
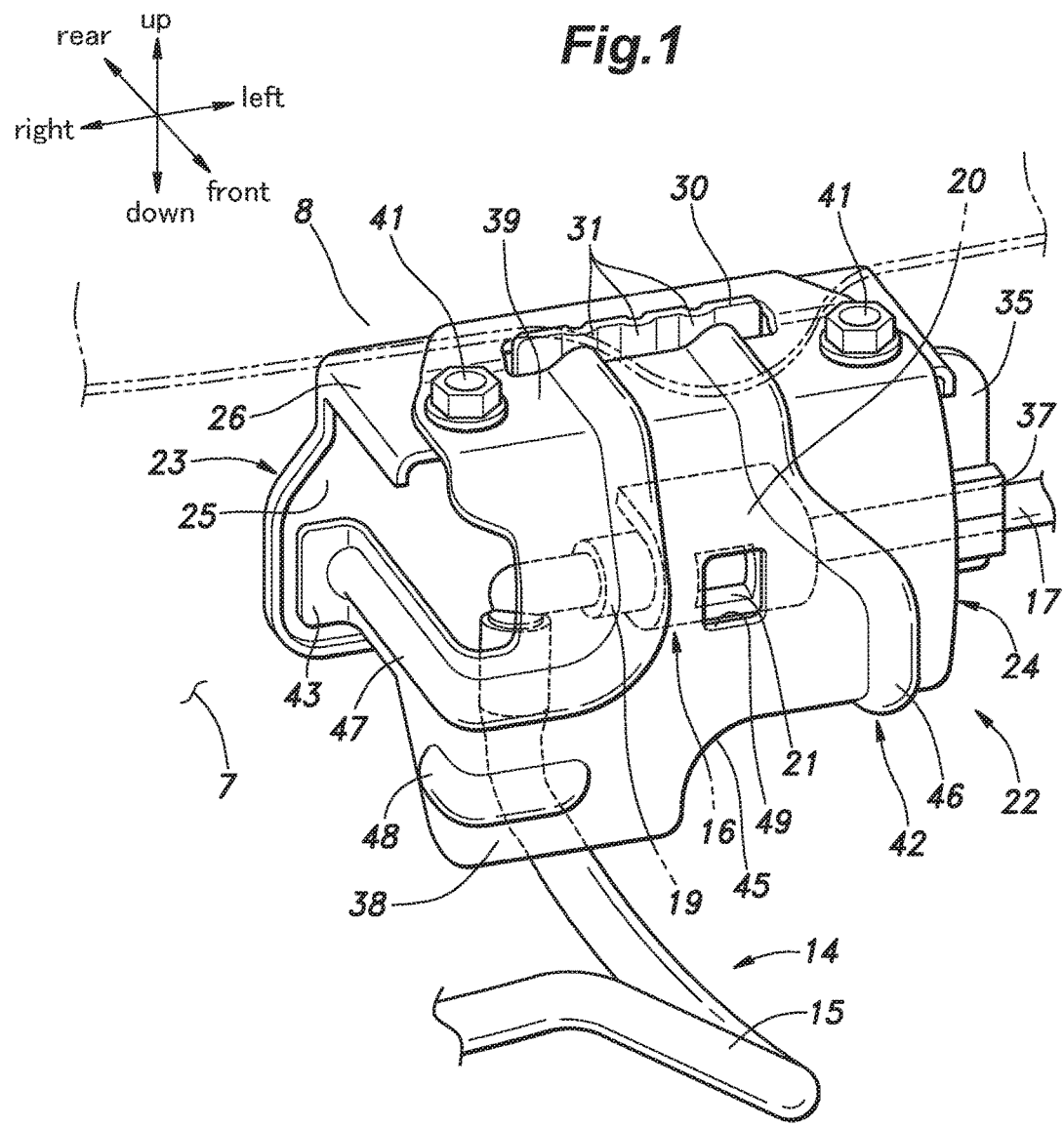
FIG. 1 is a perspective view of fuel line protective structure according to an embodiment of the present invention.
Figure 2:
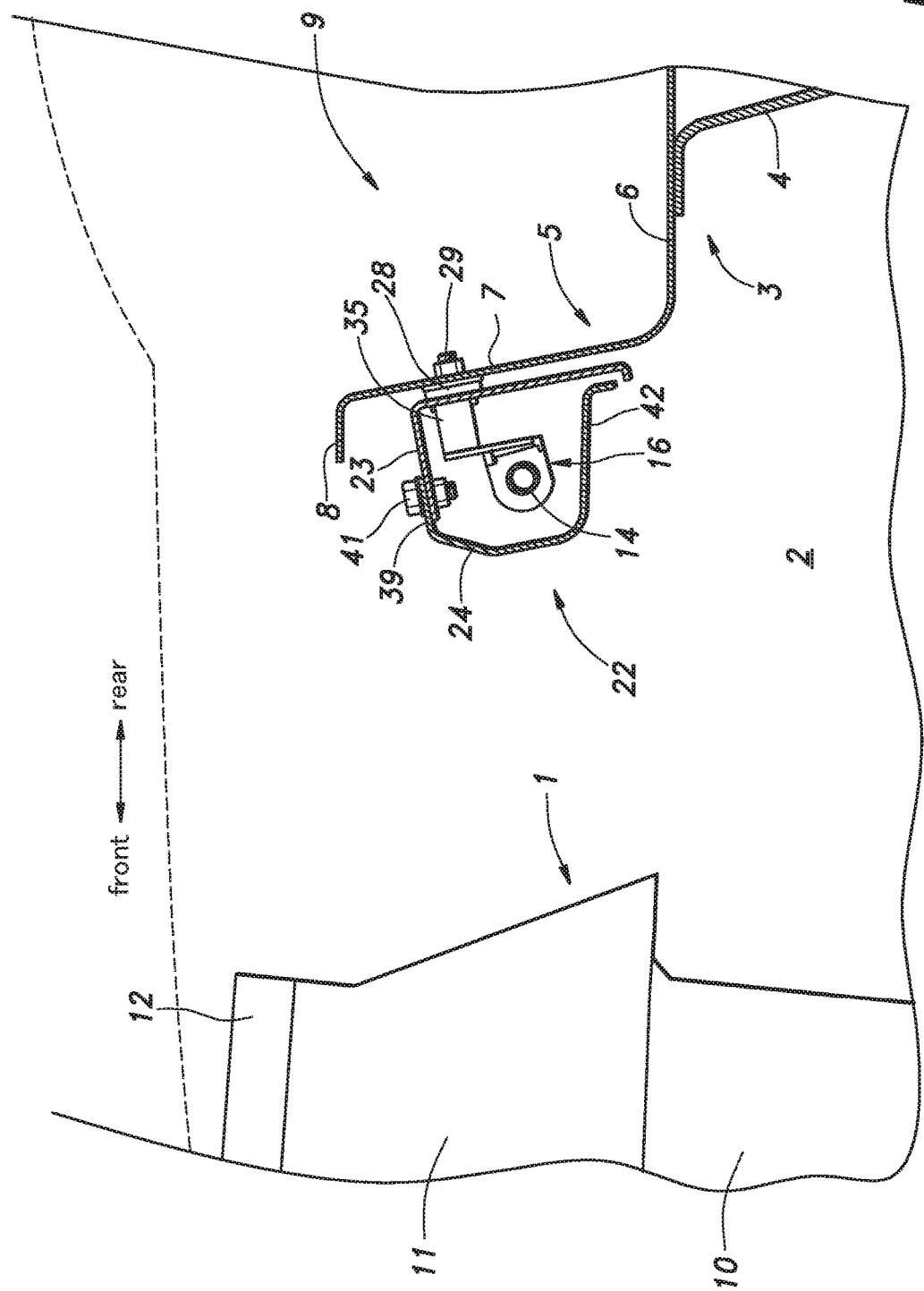
FIG. 2 is a longitudinal sectional view of an engine room containing the fuel line protective structure, with an engine shown schematically.

As shown in FIGS. 1 and 2, an engine room 2 in which an engine 1 is disposed is defined in a front part of a vehicle body. A dashboard 3 is provided on a rear side of the engine room 2 to partition the engine room 2 and a passenger compartment from each other. The dashboard 3 includes a dashboard lower member 4 and a dashboard upper member 5 each formed of a plate member. The dashboard lower member 4 extends vertically and has a principal surface facing in a fore and aft direction, with an upper end portion being bent to extend horizontally. The dashboard upper member 5 includes a first wall portion 6 extending horizontally to have a vertically facing principal surface and attached to the upper end portion of the dashboard lower member 4, a second wall portion 7 extending upward from a front end of the first wall portion 6 to have a principal surface facing in the fore and aft direction, and a third wall portion 8 extending frontward from an upper end of the second wall portion 7 to have a vertically facing principal surface. The second wall portion 7 is inclined forward toward an upper end thereof. The dashboard upper member 5 forms a lower part of a cowl box 9.

The engine 1 has a cylinder block 10 defining cylinders therein, a cylinder head 11 attached to an upper part of the cylinder block 10, and a head cover 12 mounted on the cylinder head 11. Injectors (not shown in the drawings) are mounted on a rear wall of the cylinder head 11 such that each injector injects fuel into a combustion chamber defined at an upper end of the corresponding cylinder.

The injectors are connected to a fuel tank (not shown in the drawings) via a fuel line 14. As shown in FIG. 1, the fuel line 14 includes, from an injector side (or downstream side), a delivery pipe (not shown in the drawing), a fuel feed hose 15 connected to the delivery pipe, a connecting member 16, and a fuel pipe 17 connected to the fuel tank in this order. The delivery pipe extends laterally behind the cylinder head 11, and is connected to each of the injectors. The connecting member 16 connects the fuel feed hose 15 and the fuel pipe 17 to each other. In the illustrated embodiment, the fuel feed hose 15 is made of resin, and the fuel pipe 17 is made of metal.

Figure 4:
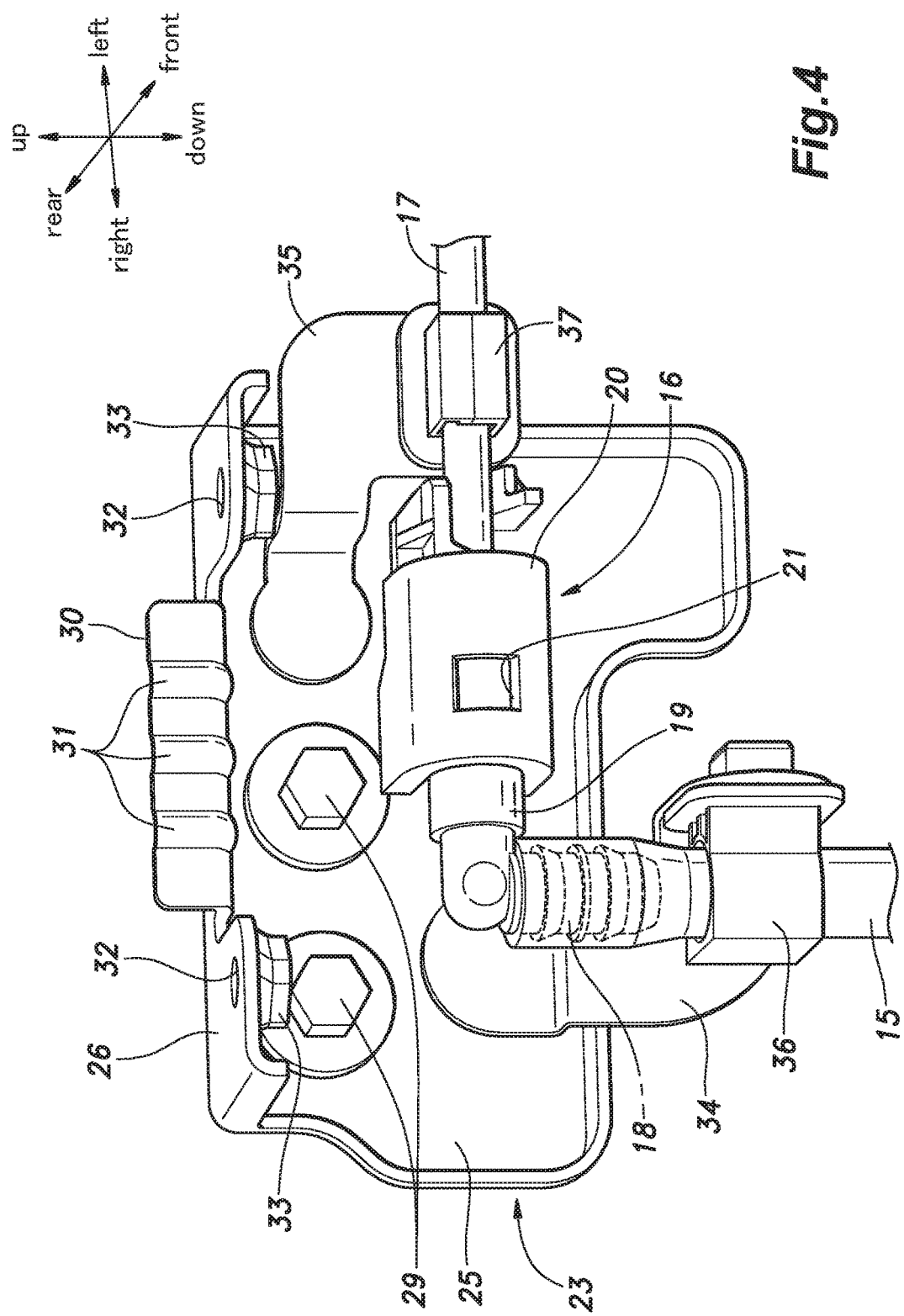
FIG. 4 is a perspective view showing a base and a fuel line, with a cover being removed.

As shown in FIG. 4, the connecting member 16 is a pipe member bent in an L-shape, and a first connecting part 18 at one end and a second connecting part 19 at the other end. The first connecting part 18 is formed as a hose nipple inserted into an end portion of the fuel feed hose 15. The second connecting part 19 is provided with a coupling hole for receiving an end portion of the fuel pipe 17 remote from the fuel tank. An outer circumference of the end portion of the fuel pipe 17 is provided with a projection, and the coupling hole is provided with an engagement claw for engaging with the projection. Owing to the engagement between the projection and the engagement claw, the fuel pipe 17 is disengageably inserted into the coupling hole. Further, an anti-separation member 20 is provided around an outer circumference of the second connecting part 19 and the fuel pipe 17, such that the anti-separation member 20 engages with the second connecting part 19 and the fuel pipe 17 to prevent the fuel pipe 17 from being separated from the connecting member 16.

A front part of the anti-separation member 20 is formed with a first peephole 21 that is substantially rectangular in shape and extends through the anti-separation member in the fore and aft direction. The first peephole 21 enables visual inspection of the coupling part between the second connecting part 19 and the fuel pipe 17.

As shown in FIG. 2, a protective structure 22 for supporting and protecting the fuel line 14 (more specifically, the connecting member 16) is mounted on the dashboard upper member 5. As shown in FIG. 2, the protective structure 22 is attached to the second wall portion 7 of the dashboard upper member 5 at a position behind the cylinder head 11. The protective structure 22 includes a base 23 attached to the front face of the second wall portion 7, and a cover 24 fastened to the base 23. The base 23 and the cover 24 are each formed of a sheet metal member.

As shown in FIG. 4, the base 23 includes a plate-shaped base main wall 25 extending substantially in parallel with the second wall portion 7, and base extension wall 26 projecting forward from an upper edge of the base main wall 25. The base main wall 25 extends laterally, and a left end part thereof extends downward such that the base main wall 25 assumes a substantially L-shape as seen from the front. The left, right, and lower edges of the base main wall 25 are bent forward to form a forward projecting wall extending continuously along the side and lower edges of the base main wall 25. An upper part of the base main wall 25 is formed with two attachment holes 27 (see FIG. 5) which are arranged one next to the other.

Figure 5:
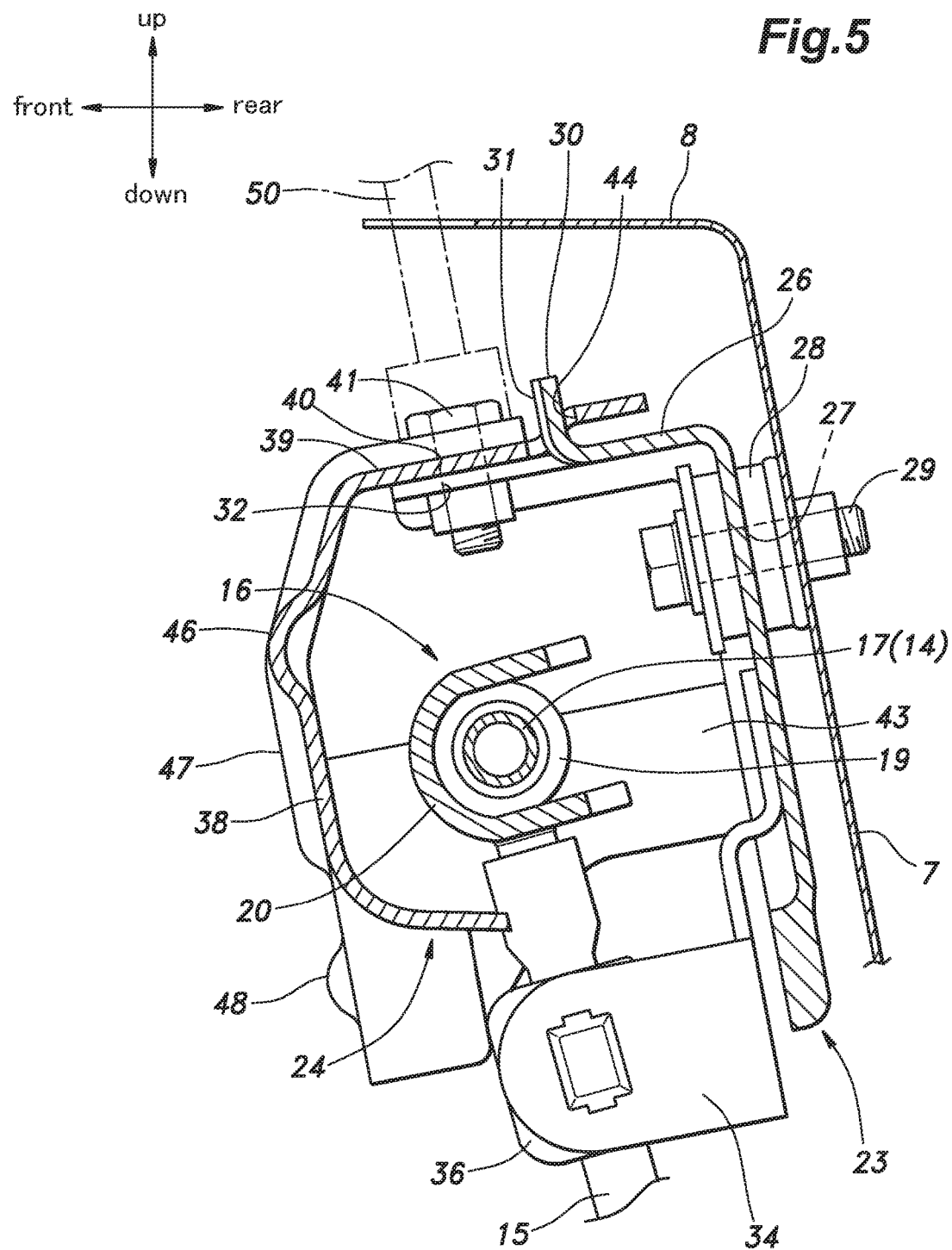
FIG. 5 is a sectional view taken along line V-V of FIG. 3.

As shown in FIG. 5, two rubber mount members 28 are inserted in the corresponding attachment holes 27. The base main wall 25 is fastened to the front surface of the second wall portion 7 by means of two bolts 29 that are passed through the corresponding rubber mount members 28. Namely, the base main wall 25 is attached to the second wall portion 7 via the rubber mount members 28.

As best shown in FIG. 4, a laterally central portion of the front end part of the base extension wall 26 is cut and raised upright to form an upward protrusion 30. The protrusion 30 has a principal surface facing in the fore and aft direction and formed with a plurality of vertically extending ribs 31. The base extension wall 26 has two bolt holes 32 respectively formed in laterally outer portions of the base extension wall 26 relative to the protrusion 30, such that each bolt hole 32 extends vertically through the base extension wall 26. Two nuts 33 are welded to an underside of the base extension wall 26 at positions corresponding to the bolt holes 32. In the present embodiment, to improve the stiffness of the base extension wall 26 against load applied from the front (or from the engine room side), left and right edges of the base extension wall 26 are bent downward.

As shown in FIG. 4, the base main wall 25 is provided with a first stay 34 and a second stay 35. Each of the first stay 34 and the second stay 35 is made of a sheet metal member, and is welded to the base main wall 25 at one end thereof. The other end of the first stay 34 is provided with a hose fixture 36 for fixing the fuel feed hose 15, while the other end of the second stay 35 is provided with a pipe fixture 37 for fixing the fuel pipe 17. The hose fixture 36 is positioned below the base main wall 25, and fixes the fuel feed hose 15 to the first stay 34 such that the fuel feed hose 15 extends vertically. The pipe fixture 37 is positioned to the left of the base main wall 25, and fixes the fuel pipe 17 to the second stay 35 such that the fuel pipe 17 extends laterally. With the fuel feed hose 15 and the fuel pipe 17 fixed to the first stay 34 and the second stay 35, respectively, the connecting member 16 is supported by the base 23 in front of the base main wall 25.

As shown in FIG. 1, the cover 24 includes a plate-shaped cover main wall 38 having a substantially rectangular shape, and a plate-shaped cover extension wall 39 that extends from an edge (upper edge in FIG. 1) of the cover main wall 38 substantially perpendicularly to the cover main wall 38. When the cover 24 is assembled with the base 23, the cover extension wall 39 is positioned above and overlaps with the base extension wall 26 as seen in plan view, with an under surface of the cover extension wall 39 extending along the base extension wall 26. The cover extension wall 39 is formed with two bolt holes 40 (FIG. 4) at positions corresponding to the bolt holes 32 of the base extension wall 26, such that the bolt holes 40 extend vertically through the cover extension wall 39. Two bolts (fastening member) 41 are passed through the corresponding bolt holes 32, 40 and threadably engaged with the corresponding nuts 33, whereby the cover 24 is fastened to the base 23.

In the state where the cover 24 is fastened to the base 23, the cover main wall 38 extends substantially in parallel with the base main wall 25 at a position ahead of the base main wall 25, the fuel line 14, the anti-separation member 20, the first stay 34, and the second stay 35. Namely, the cover main wall 38 extends vertically in front of the fuel line 14, with a principal surface thereof facing in the fore and aft direction. The cover extension wall 39 extends rearward from the upper edge of the cover main wall 38.

Figure 3:
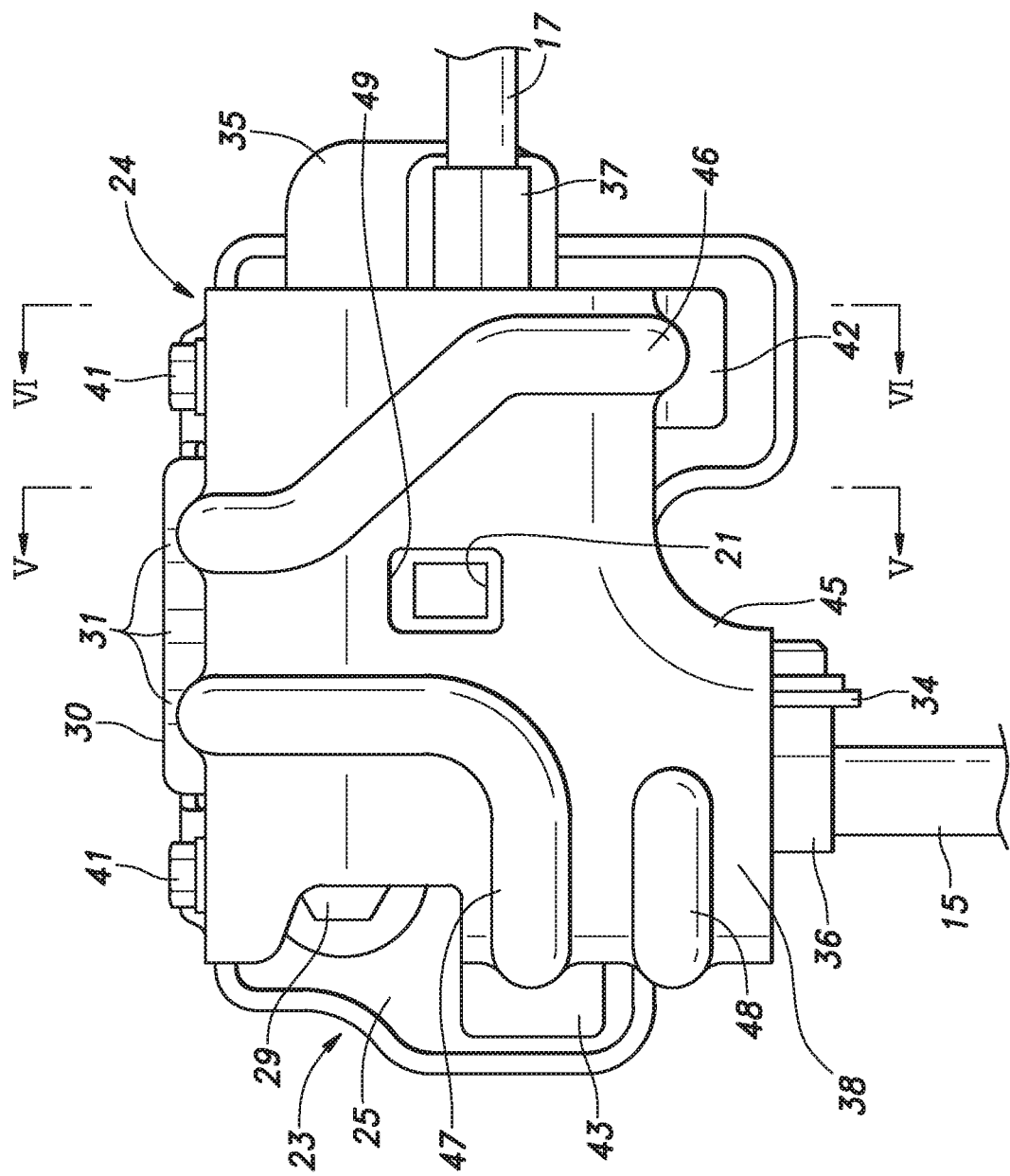
FIG. 3 is a front view of a fuel line protective structure.

As shown in FIG. 3, the cover 24 further includes a first leg 42 that extends rearward (same direction as the cover extension wall 39) from a lower edge of the cover main wall 38, which is an edge opposite to the edge (upper edge) from which the cover extension wall 39 extends. The first leg 42 has a principal surface facing substantially vertically. The first leg 42 is positioned at a lower left portion of the cover main wall 38. As shown in FIG. 6, an upper surface of the first leg 42 is slanted downward toward the free end of the first leg 42 (or rearward).

The cover 24 further includes a second leg 43 that extends rearward (same direction as the cover extension wall 39) from a vertically extending side edge of the cover main wall 38, which is an edge different from the edges (upper and lower edges) from which the cover extension wall 39 and the first leg 42 extend. The second leg 43 has a principal surface facing substantially laterally.

The free ends of the first leg 42 and the second leg 43 are located in front of the base main wall 25 to be spaced apart from the same. In the illustrated embodiment, the free end of the first leg 42 is bent downward and extends substantially in parallel with the base main wall 25. The free end of the second leg 43 is bent to the right and extends substantially in parallel with the base main wall 25.

As shown in FIG. 5, a central part of the cover extension wall 39 is provided with a receiving hole 44 which is elongated laterally and extends through the cover extension wall 39 vertically. The protrusion 30 is passed through the receiving hole 44 and protrudes upward therefrom. A rear portion of the cover extension wall 39 is bent upward and then rearward such that a part of the cover extension wall 39 on the rear side of the receiving hole 44 is located higher than a part of the cover extension wall 39 on the front side of the receiving hole 44.

As shown in FIGS. 1 and 3, the cover 24 is provided with a first rib 46 and a second rib 47. The first rib 46 extends from the cover extension wall 39 to the first leg 42 via the cover main wall 38. One end of the first rib 46 is located at the left front edge of the receiving hole 44, and the other end of the first rib 46 is located at the free end of the first leg 42. The second rib 47 extends from the cover extension wall 39 to the second leg 43 via the cover main wall 38. One end of the second rib 47 is located at the right front edge of the receiving hole 44, and the other end of the second rib 47 is located at the free end of the second leg 43. The second rib 47 is bent to the right by about 90 degrees on the cover main wall 38. In the illustrated embodiment, a third rib 48 is provided below the second rib 47 to extend across a connecting part between the second leg 43 and the cover main wall 38.

As shown in FIGS. 1 and 3, the lower left portion of the cover main wall 38 extends more downward than the lower right portion of the cover main wall 38, such that the left portion of the lower edge of the cover main wall 38 is located below the right portion of the lower edge of the cover main wall 38. The left and right portions of the lower edge of the cover main wall 38 is connected to each other via a curved portion 45 formed in a laterally central part of the lower edge such that the curved portion 45 curves downward from left to right. The curved portion 45 is located to the right of the first leg 42. The cover member 24 includes a portion that extends rearward from the curved portion 45 to form a part of a base end portion of the first leg 42.

As shown in FIG. 1, the fuel feed hose 15 is passed between the curved portion 45 and the second leg 43 (or between the first leg 42 and the second leg 43) and extends to the connecting member 16, which is disposed between the base main wall 25 and the cover main wall 38. The fuel pipe 17 is passed between the cover extension wall 39 and the first leg 42 and extends to the connecting member 16.

The cover main wall 38 is provided with a second peephole 49 that is substantially rectangular in shape and extends through the cover main wall 38 in the fore and aft direction. The second peephole 49 is formed to be positioned in front of the first peephole 21 formed in the anti-separation member 20 of the connecting member 16. Thereby, the coupling part between the fuel pipe 17 and coupling hole can be visually inspected through the second peephole 49 of the cover main wall 38.

As best shown in FIG. 2, in the illustrated embodiment, the cover main wall 38 is formed to have a ridge line extending laterally and protruding forward at a substantially central part thereof in the vertical direction. This improves the stiffness of the cover main wall 38 against load from the front.

In the following, the features and advantages of the fuel line protective structure 22 configured as described above will be described. The bolts 41 for fastening the cover extension wall 39 and the base extension wall 26 to each other extend vertically, and therefore, can be inserted into the corresponding bolt holes 32, 40 of the base extension wall 26 and the cover extension wall 39 downward from above. Above the bolts 41, a space for placing a tool 50 (see FIGS. 5 and 6) for tightening the bolts, such as an impact wrench, can be easily secured. Therefore, a worker is allowed to engage the tool 50 with the bolts 41 from above the protective structure 22, and hence, can perform tightening of the bolts 41 easily.

When fastening the cover 24 to the base 23, the worker can hook the receiving hole 44 of the cover 24 on the protrusion 30 of the base 23, to provisionally fix the cover 24 relative to the base 23. This facilitates alignment of the bolt holes 32, 40 and fastening of the bolts 41.

In a case where the engine 1 moves rearward in the engine room 2 as a result of a forward collision or the like, the cover 24 collides with the cylinder head 11 and prevents direct collision between the cylinder head 11 and the fuel line 14. The rearward load imparted by the cylinder head 11 is input to the cover main wall 38, and the cover main wall 38 bends rearward relative to the cover extension wall 39 fastened to the base extension wall 26. At this time, the free ends of the first leg 42 and the second leg 43 come into abutment with and are supported by the front face of the base main wall 25 to restrict the rearward movement of the cover main wall 38. Thereby, a space accommodating the fuel line 14 therein is maintained between the cover main wall 38 and the base main wall 25, and hence, the fuel line 14 is protected.

In the above embodiment, the first leg 42 has a principal surface facing vertically, and the second leg 43 has a principal surface facing laterally. Thereby, the first leg 42 and the second leg 43 cooperate with each other to improve the stiffness of the cover 24 both vertically and laterally. Therefore, the first leg 42 and the second leg 43 can reliably maintain the integrity against rearward load applied to the cover main wall 38, to thereby restrict the rearward movement of the cover main wall 38.

The fuel line 14 is arranged to pass between the cover extension wall 39 and the first leg 42 and between the first leg 42 and the second leg 43. Owing to this arrangement, the fuel line 14 is protected even more reliably.

The first rib 46 and the second rib 47 improve the stiffness of the cover extension wall 39, the cover main wall 38, the first leg 42, and the second leg 43. Further, because the first rib 46 extends across the connecting part between the cover extension wall 39 and the cover main wall 38 and across the connecting part between the cover main wall 38 and the first leg 42, the first rib 46 can improve the stiffness at these connecting parts. The second rib 47 extends across the connecting part between the cover extension wall 39 and the cover main wall 38 and across the connecting part between the cover main wall 38 and the second leg 43, and therefore, the second rib 47 can improve the stiffness at these connecting parts. Further, in the above embodiment, the third rib 48 is provided to extend across the connecting part between the cover main wall 38 and the second leg 43, and this contributes to preventing deformation at the connecting part.

In addition to the fastening by the bolts 41, the protrusion 30 and an edge of the receiving hole 44 abut against each other, and this improves the stiffness at the joint between the base extension wall 26 and the cover extension wall 39 against load applied from the front.

The cover 24 is fastened to the base extension wall 26 provided to extend from the upper edge of the base main wall 25, and the base 23 is fastened to the dashboard upper member 5 at an upper part of the base main wall 25. Therefore, the load applied to the base extension wall 26 from the cover 24 is transmitted to the dashboard upper member 5 via the upper part of the base main wall 25. As a result, deformation of the lower part of the base main wall 25 is prevented.

The free ends of the first leg 42 and the second leg 43 are disposed in front of the base main wall 25 with a space defined between each free end and the base main wall 25, and therefore, it is unnecessary to fasten the first leg 42 and the second leg 43 to the base main wall 25, and this makes the assembly work easy. Also, even when vibration is applied to the cover 24, the free ends of the first leg 42 and the second leg 43 do not come into contact with the base main wall 25. Therefore, generation of noise due to contact of the first leg 42 and the second leg 43 against the base main wall 25 is prevented.

Because the base main wall 25 is attached to the second wall portion 7 via the rubber mount members 28, vibration transmitted from the fuel line 14 to the second wall portion 7 of the dashboard upper member 5 via the base main wall 25 is dampened by the rubber mount members 28, and hence, vibration of the dashboard upper member 5 is suppressed.

The first leg 42 is slanted downward toward the free end thereof, and therefore, rainwater or the like adhering to an upper surface of the first leg 42 is caused to move downward along the upper surface and is discharged from the free end. This contributes to preventing corrosion of the first leg 42.

The base 23 and the cover 24 are each made of a sheet metal member, and thus, can be made easily and at low cost.

The concrete embodiment of the present invention has been described in the foregoing, but the present invention is not limited to the embodiment and may be modified in various ways. For example, in the above embodiment, the protective structure 22 was exemplarily arranged to protect the connecting member 16 of the fuel line 14, but the protective structure 22 may be arranged to protect another part of the fuel line 14, such as an intermediate part of the tubular member (such as the fuel pipe 17 or the fuel feed hose 15). Also, the fuel line may be connected to a flow control valve, and the protective structure 22 may be arranged to protect a connector for connecting the tubular member of the fuel line 14 with the flow control valve.

Also, the base 23 may not be attached to the dashboard upper member 5, but to another vehicle body wall, such as the dashboard lower member 4 and an inner wall of a front side frame.

The protrusion 30 may be configured to extend in the fore and aft direction. In this case, the protrusion 30 is made less easy to deform against the load in the fore and aft direction, and thus, contributes to retaining the space accommodating the fuel line 14 therein.

In the foregoing embodiment, the present invention was exemplarily applied to the front part of the vehicle body of the engine 1, but the present invention may be applied to a vehicle in which the engine 1 is mounted in a rear part of the vehicle body. Besides, the concrete structure, position, number, angle, etc. of each member or part may be changed as appropriate within the scope of the present invention. Not all of the structural elements of the fuel line protective structure 22 shown in the above embodiment are necessarily indispensable and they may be selectively used as appropriate.

The invention claimed is:

1. A fuel line protective structure, comprising:
   a base including a base main wall that is attached to a vehicle body wall defining a part of an engine room and extends vertically, a stay fixed to the base main wall to hold a fuel line, and a base extension wall extending from an upper part of the base main wall in a direction away from the vehicle body wall;
   a cover including a cover main wall disposed to oppose the base main wall and to be located in front of the stay and the fuel line, a cover extension wall extending from the cover main wall along the base extension wall such that the cover extension wall overlaps the base extension wall as seen in plan view, and a leg extending from the cover main wall toward the base main wall below the cover extension wall; and
   a fastening member extending vertically through overlapping parts of the base extension wall and the cover extension wall to fasten the base and the cover to each other.

2. The fuel line protective structure as defined in claim 1, wherein a free end of the leg opposes the base main wall with a space defined between the free end and the base main wall.

3. The fuel line protective structure as defined in claim 1, wherein the cover is provided with a rib extending from the cover extension wall to the leg via the cover main wall.

4. The fuel line protective structure as defined in claim 1, wherein the leg includes a first leg extending from a lower end of the cover main wall toward the base main wall and a second leg extending from a side edge of the cover main wall toward the base main wall.

5. The fuel line protective structure as defined in claim 4, wherein the cover includes a rib extending from the cover extension wall to the second leg via the cover main wall, the rib being bent by about 90 degrees on the cover main wall.

6. The fuel line protective structure as defined in claim 4, wherein the fuel line is arranged to pass between the cover extension wall and the first leg and between the first leg and the second leg.

7. The fuel line protective structure as defined in claim 4, wherein the first leg has a principal surface facing vertically, and the second leg has a principal surface facing laterally.

8. The fuel line protective structure as defined in claim 4, wherein the first leg is slanted downward toward a free end thereof.

9. The fuel line protective structure as defined in claim 1, wherein the base extension wall is provided with an upward protrusion, and the cover extension wall is provided with an opening configured to receive the protrusion.

10. The fuel line protective structure as defined in claim 1, wherein the base is attached to the vehicle body wall at an upper part of the base main wall.

11. The fuel line protective structure as defined in claim 1, wherein the base and the cover are each made of a bent sheet member.

12. The fuel line protective structure as defined in claim 1, wherein the leg has a free end including a portion extending substantially in parallel with the base main wall.

13. The fuel line protective structure as defined in claim 1, wherein the cover main wall is provided with an opening for enabling visual inspection of the fuel line.

* * * * *